United States Patent [19]

Stuebner

[11] Patent Number: 4,655,936
[45] Date of Patent: Apr. 7, 1987

[54] MICROBIOLOGICAL CONTROL IN URANIUM PROCESSING

[75] Inventor: Terry L. Stuebner, San Antonio, Tex.

[73] Assignee: Nalco Chemical Company, Naperville, Ill.

[21] Appl. No.: 777,807

[22] Filed: Sep. 19, 1985

[51] Int. Cl.⁴ .............................................. C02F 1/50
[52] U.S. Cl. .................................. 210/764; 210/747; 423/7; 423/17
[58] Field of Search ..................... 210/764, 747; 423/6, 423/7, 3, 17, 253, 260

[56] References Cited

U.S. PATENT DOCUMENTS

| | | | |
|---|---|---|---|
| 4,295,932 | 6/1981 | Pocius | 210/764 |
| 4,296,075 | 10/1981 | Yan | 423/17 |
| 4,489,042 | 12/1984 | Savins et al. | 423/17 |
| 4,490,336 | 12/1984 | Worthington et al. | 423/260 |
| 4,505,889 | 3/1985 | Amick | 210/764 |
| 4,519,985 | 5/1985 | Wells et al. | 423/6 |
| 4,552,752 | 11/1985 | Amick | 210/764 |

OTHER PUBLICATIONS

Kirk-Othmer *Encyclopedia of Chemical Technology*, vol. 21, John Wiley & Sons, 1970, pp. 12-18.

*Primary Examiner*—Benoit Castel
*Attorney, Agent, or Firm*—John G. Premo; Donald G. Epple; Anthony L. Cupoli

[57] ABSTRACT

A method of improving the recovery of U$_3$O$_8$ from circulating aqueous leach fluids used to extract uranium from its ores in underground uranium fields, which fields are made up of a series of injection and producing wells, which aqueous fluids are contaminated by suspended and dissolved inorganic iron compounds caused by the presence of anerobic and aerobic bacteria, which comprises treating such aqueous leach fluids with at least 0.1 ppm of a mixture of 75% of 5-chloro-2-methyl-4-isothiazolin-3-one and 25% 2-methyl-4-isothiazolin-3-one.

1 Claim, 5 Drawing Figures

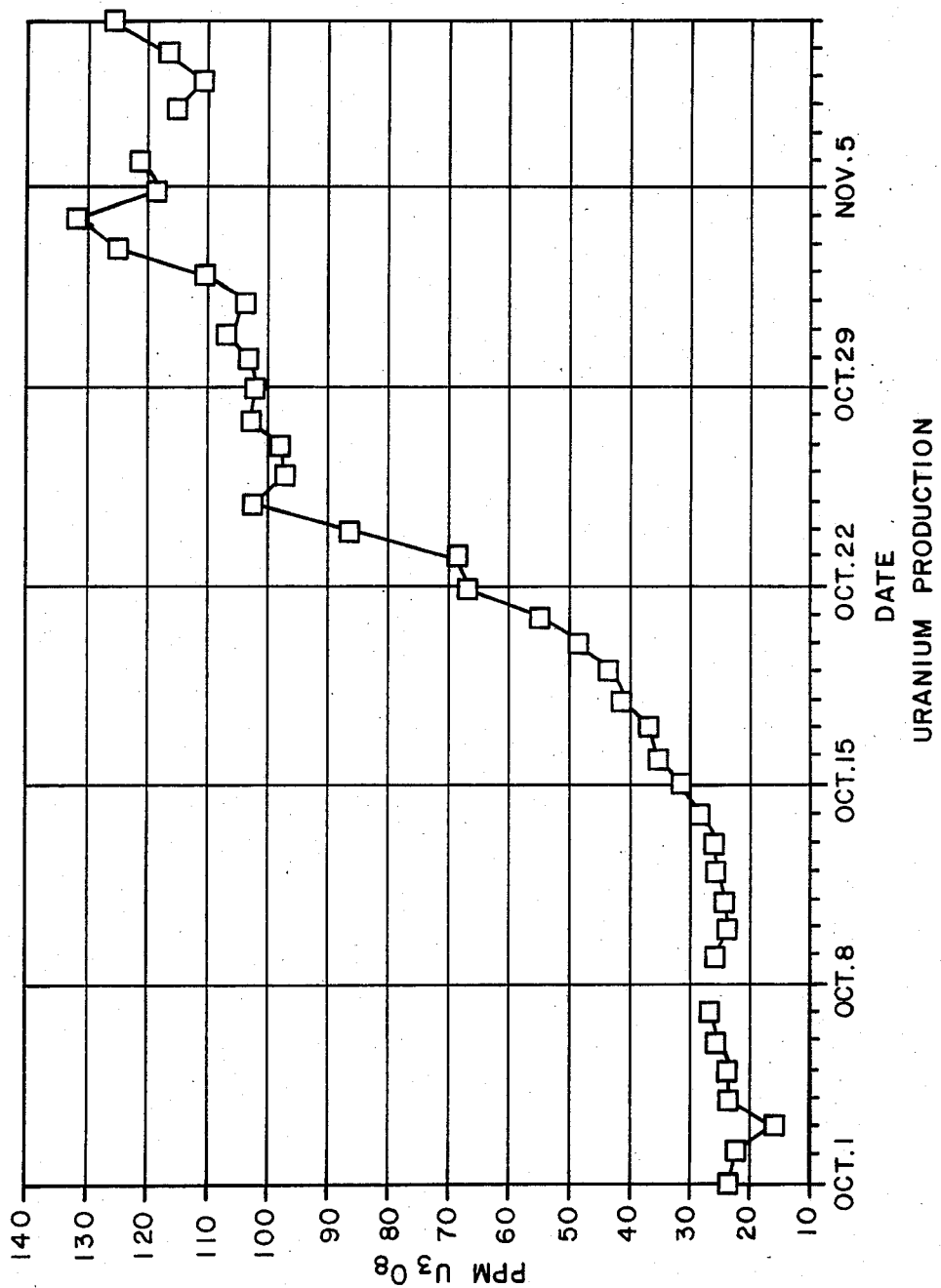

MICROBIOLOGICAL CONTROL IN URANIUM PROCESSING

INTRODUCTION

One method of recovering uranium as $U_3O_8$ comprises injecting water into an underground formation containing uranium ore. This injection is accomplished by using a series of connected injection and producing wells. In a typical scheme of this sort, the injection water is treated with an oxidizing agent such as oxygen along with carbon dioxide. The water is injected into one or more injection wells and then recovered from one or more producing wells in the form of a leachate in which the uranium, among other materials, is present in the form of uranium carbonate. A method of extracting the uranium from the leachate is to subject it to a strong base ion exchange process.

In certain instances, the aqueous injection fluids which are circulated tend to build up both soluble and insoluble compounds of iron. These compounds are predominantly inorganic and can be the oxides and sulfides of iron. For more details with respect to uranium processing, see Kirk-Othmer *Encyclopedia of Chemical Technology*, Vol. 21, John Wiley & Sons, Inc., 1970, pp. 12–18.

As the iron levels increase, the conversion of uranium to its oxidized form and then to uranium carbonate diminish. The injection of liquid oxygen and $CO_2$ do not bring about the level of conversion to render the process economical. The oxygen is consumed by the soluble iron, and the carbonation step can not proceed.

In perfecting my invention, I theorized that the buildup of iron in these systems could be attributed to the presence of both aerobic and anaerobic bacteria. I sampled several well lines in a commercial field that was experiencing heavy iron contamination problems which were so severe they not only interferred with the conversion to uranium carbonate but, also, the ion exchange extraction process.

Since the injection water was circulated and if bacteria were causing the iron problem, then it was apparent that a cross-contamination of all the injection and producing wells and lines was occurring.

To test my theory, I sampled a number of points in the system and had them analyzed for the presence of both aerobic and anaerobic bacteria. The results of these samplings are set forth below in Table I.

TABLE I

Microbiological Evaluation
Physical Appearance: Gauze W Liquid

|  | Sample Point 1 | Sample Point 2 | Sample Point 3 | Sample Point 4 | Sample Point 5 | Sample Point 6 |
|---|---|---|---|---|---|---|
| TOTAL AEROBIC BACTERIA | 120000 | 75000 | 200000 | 110000 | 14000 | 130000 |
| Aerobacter | 10 | 10 | 10 | 10 | 300 | 10 |
| Pigmented | 10 | 10 | 700 | 100 | 200 | 2000 |
| Mucoids | 10 | 10 | 10 | 10 | 10 | None |
| Pseudomonas | 20000 | 30000 | 80000 | 5000 | 6000 | 60000 |
| Sporeformers | 2 | 3 | None | 1 | None | None |
| Others | 99998 | 44997 | 119300 | 104899 | 7500 | 68000 |
| TOTAL ANAEROBIC BACTERIA | 10 | 5 | 5 | None | 5 | None |
| Sulfate Reducers | None | None | None | None | None | None |
| Clostridia | 10 | 5 | 5 | None | 5 | None |

After determining the above, I then considered methods for preventing the excessive iron contamination of the aqueous fluid. I accomplished this as follows:

THE INVENTION

A method of improving the recovery of $U_3O_8$ from circulating aqueous leach fluids used to extract uranium from its ores in underground uranium fields, which fields are made up of a series of injection and producing wells, which aqueous fluids are contaminated by suspended and dissolved inorganic iron compounds caused by the presence of anerobic and aerobic bacteria, which comprises treating such aqueous leach fluids with at least 0.1 ppm of a mixture of 75% of 5-chloro-2-methyl-4-isothiazolin-3-one and 25% 2-methyl-4-isothiazolin-3-one (Kathon ® 886). Kathon ® 886 is sold by Rohm and Haas.

Dosage

The amount of Kathon ® 886 used to reduce iron contamination in systems of the type described generally is within the range of 0.1–50 ppm with a preferred range being 0.5–10 ppm. It is understood that the material, Kathon ® 886, may be slug fed or fed on a continuous basis to provide an average dosage within the ranges set forth above.

Evaluation of the Invention

The composition containing Kathon 886 was used to evaluate the invention. It is hereafter referred to as Comp. 1.

Comp. 1

Water: 88.85% by weight
Copper nitrate solution 53%: 0.36% by weight
Kathon ® 886–11.5% active: 10.79% by weight A dosage of 300 ppm of Comp. 1 was applied to the recirculation line following the ion exchange columns. Product levels were monitored until 20 ppm of product residual was tested in the line as it returned from the production wells. During this period daily samples were tested for the microorganisms identified in the earlier testing. The level of all organisms decrease rapidly after the 7th day and iron levels dropped significantly after 3 days of chemical feed (continuous). Uranium production (oxidation and conversion to uranium carbonate) was restored to record highs, both in terms of ppm from the well fields and in terms of total pounds of production.

BRIEF DESCRIPTION OF THE DRAWINGS

Using the above method, the chemical dosage was based on recirculation rates of leachate fluids. To further illustrate this particular test and certain embodiments of the invention, reference may be had to the drawings of which:

FIG. 5 shows the uranium production over the test period.

Figure 1:
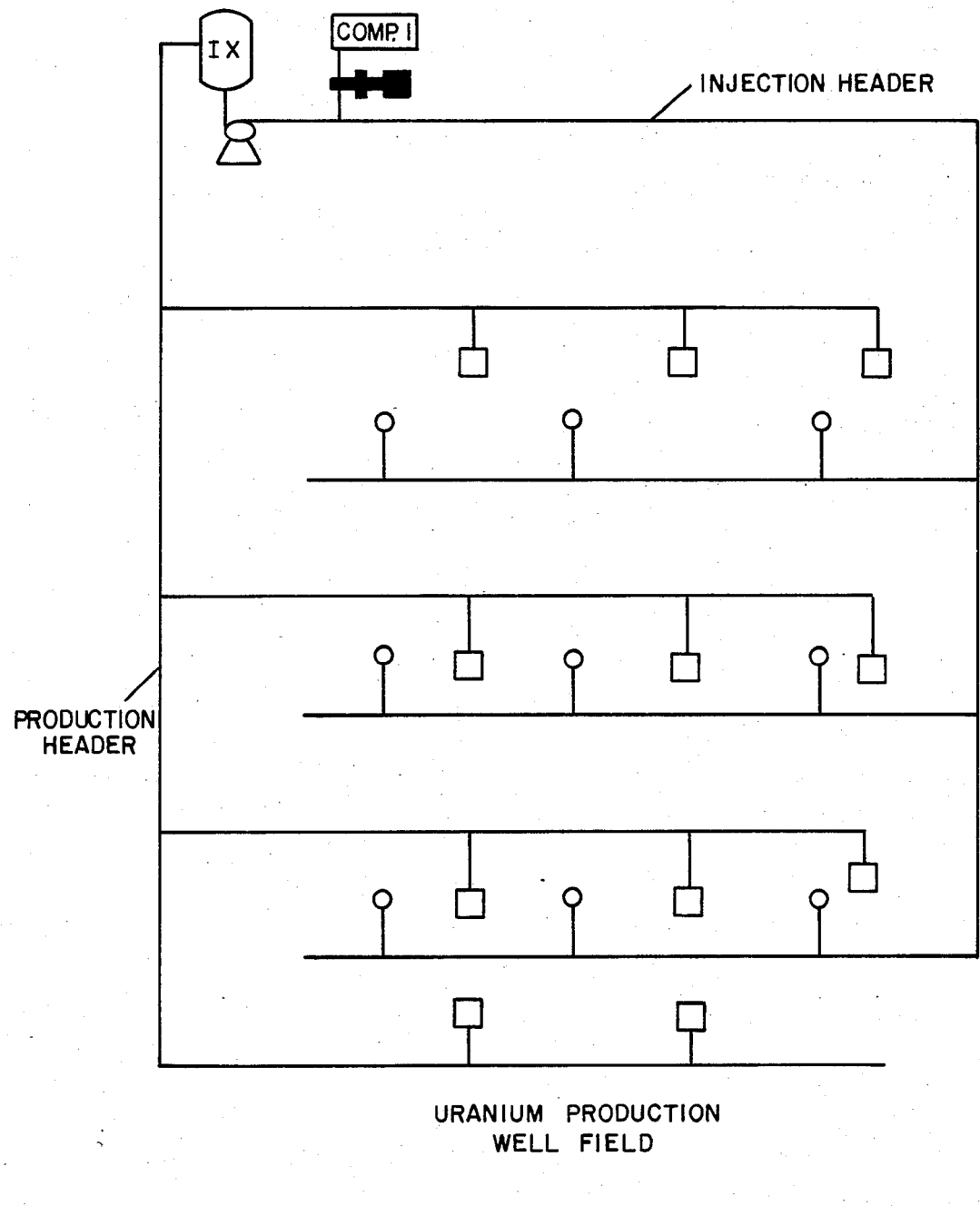
FIG. 1 is a schematic representation of the well field being tested.
Figure 2:
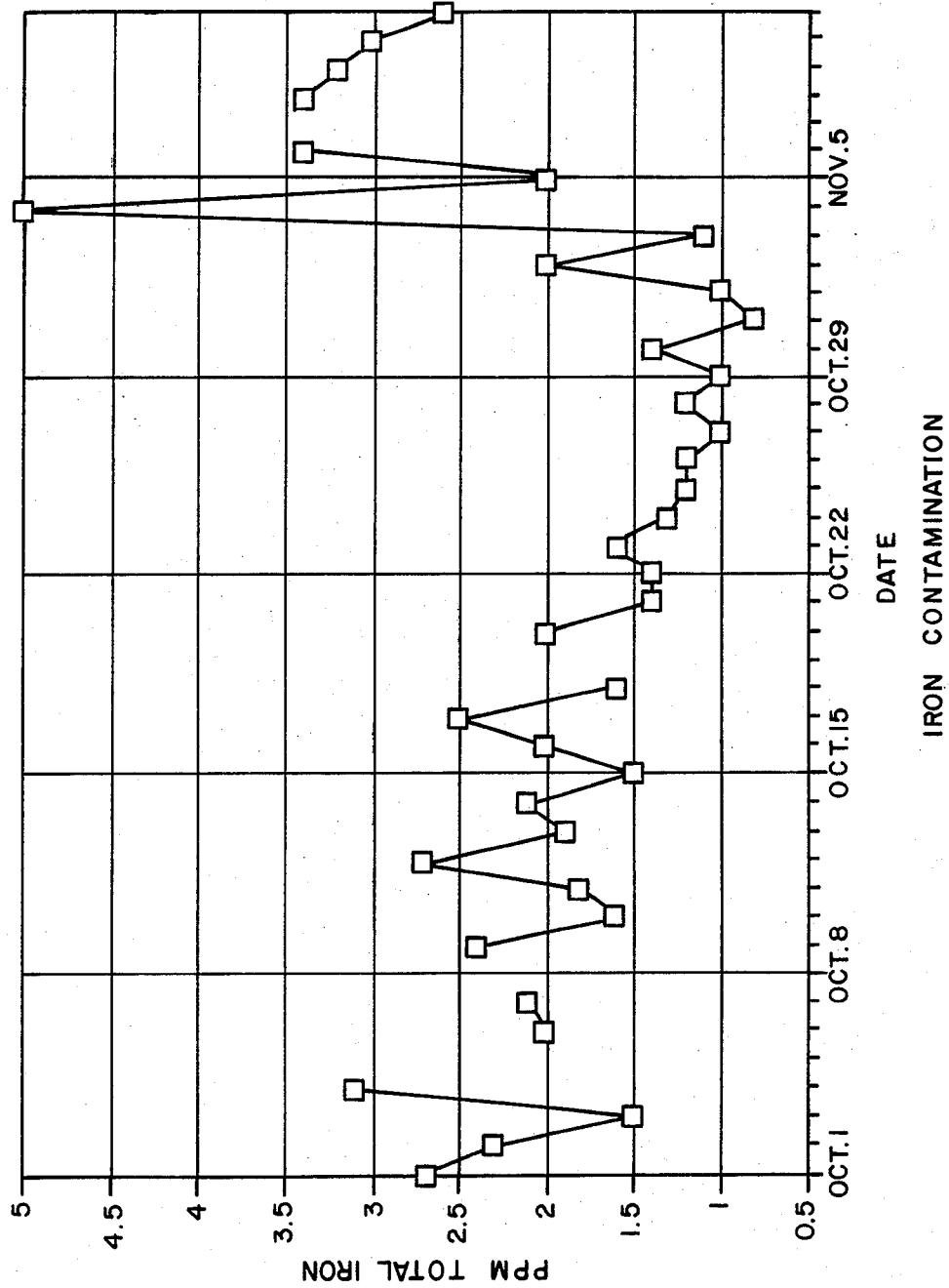
FIG. 2 shows the iron contamination over a period of time occurring in this field.
Figure 3:
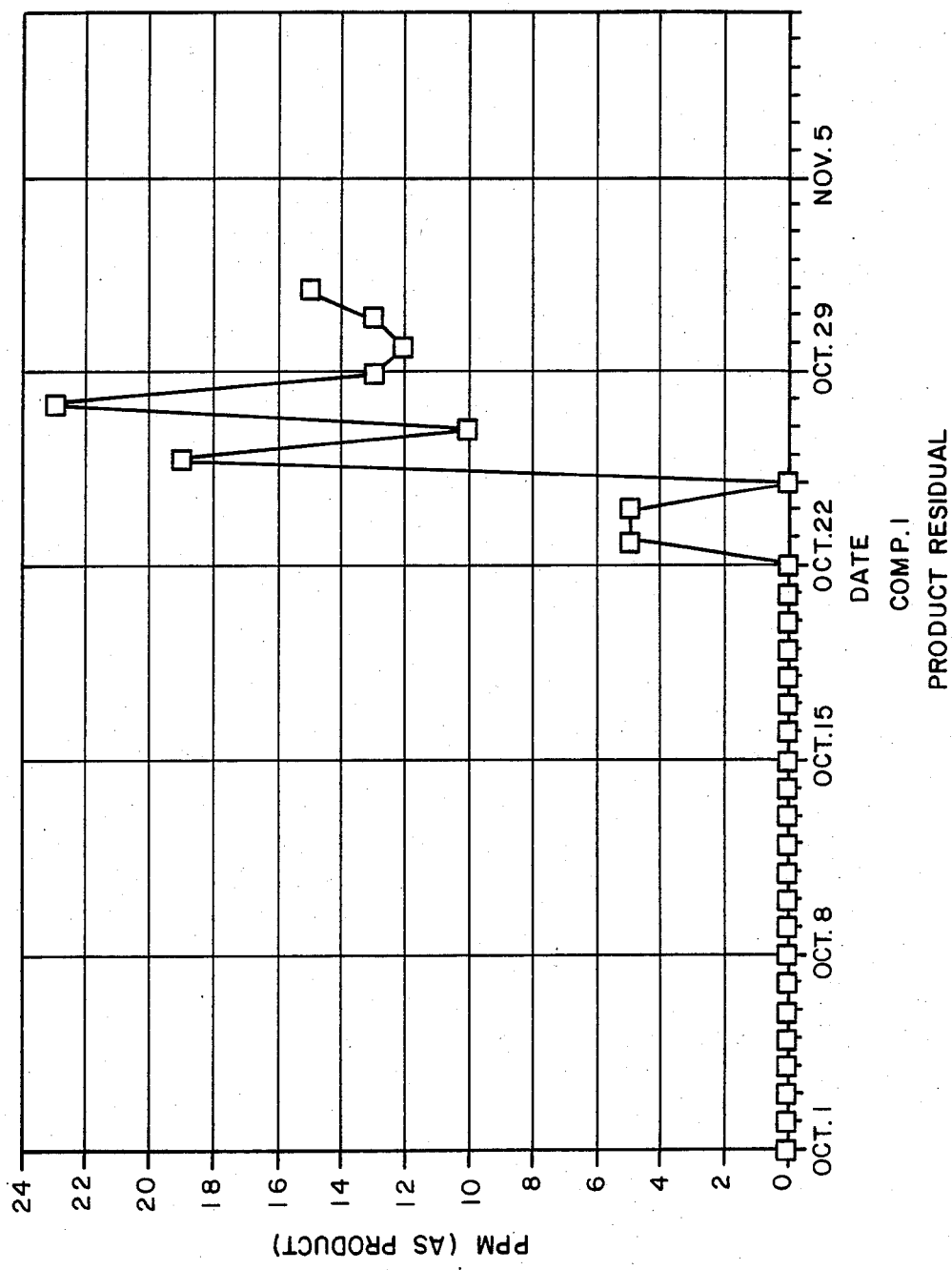
FIG. 3 shows the residual maintained in the injection water during the test.
Figure 4:
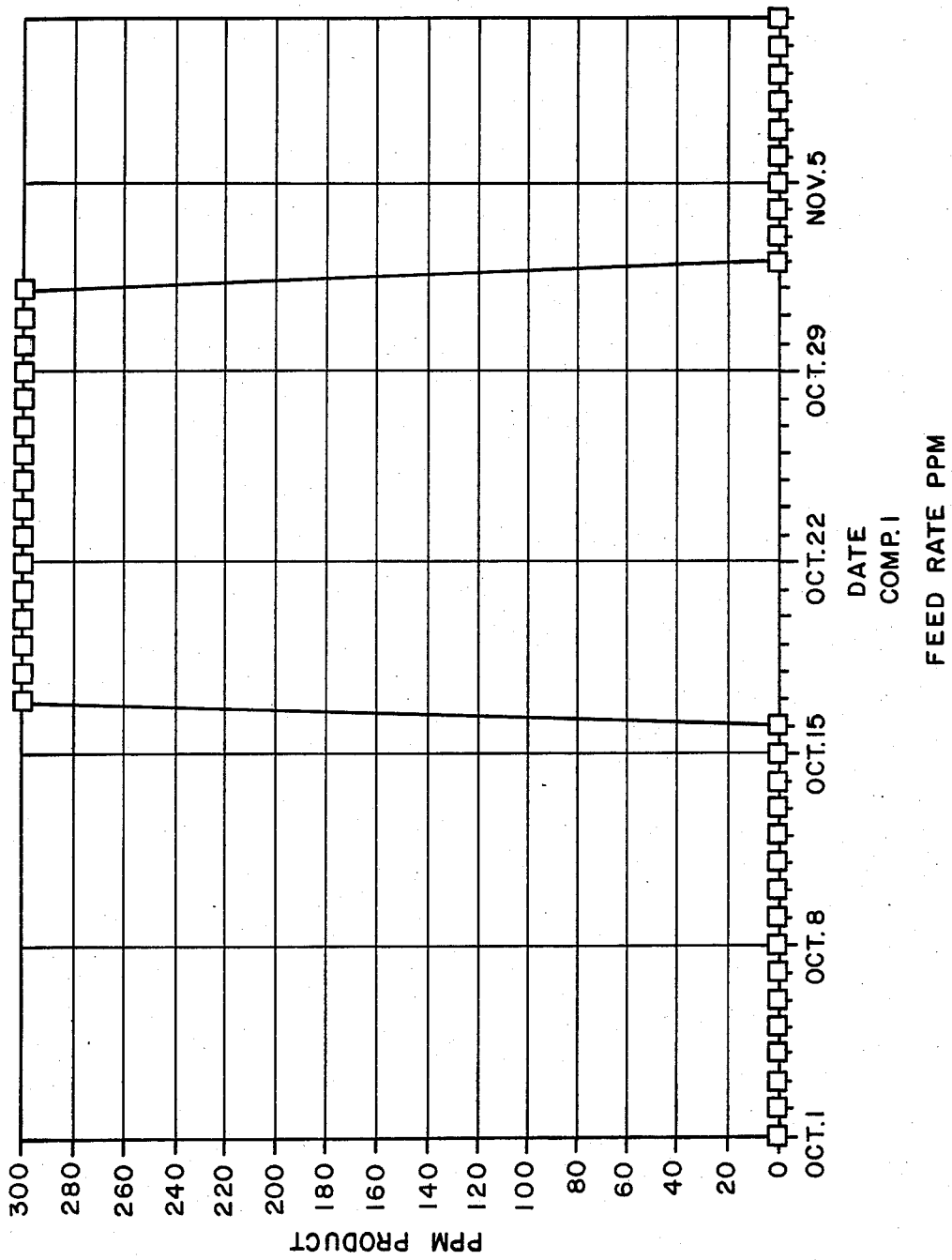
FIG. 4 shows the feed rate of Comp. 1.

Subsequent testing revealed that the troublesome organisms began to contaminate the field about one month after the initial treatment was introduced. Following chemical injection quickly restored production and lowered iron. An ongoing biological testing program was initiated to monitor the well field to identify problems prior to production losses. Each time the chemical program was initiated, the problem was controlled.

I claim:

1. A method of improving the recovery of $U_3O_8$ from circulating aqueous leach fluids used to extract uranium from its ores in underground uranium fields, which fields are made up of a series of injection and producing wells, which aqueous fluids are contaminated by suspended and dissolved inorganic iron compounds caused by the presence of anerobic and aerobic bacteria, which comprises treating such aqueous leach fluids with at least 0.1 ppm of a mixture of 75% of 5-chloro-2-methyl-4-isothiazolin-3-one and 25% 2-methyl-4-isothiazolin-3-one.

* * * * *